US011539997B1

(12) United States Patent
Borgne et al.

(10) Patent No.: US 11,539,997 B1
(45) Date of Patent: Dec. 27, 2022

(54) SYSTEMS AND METHODS FOR ON-THE-FLY REPACKAGING

(71) Applicant: Spotify AB, Stockholm (SE)

(72) Inventors: Ludvig Asger Borgne, Stockholm (SE); Peter Ingemar Zebühr, Stockholm (SE); Ulrik Sven Gunnar Mikaelsson, Stockholm (SE)

(73) Assignee: Spotify AB, Stockholm (SE)

( * ) Notice: Subject to any disclaimer, the term of this patent is extended or adjusted under 35 U.S.C. 154(b) by 3 days.

(21) Appl. No.: 17/357,707

(22) Filed: Jun. 24, 2021

(51) Int. Cl.
H04N 21/433 (2011.01)
H04N 21/262 (2011.01)
H04N 21/658 (2011.01)
H04N 21/414 (2011.01)

(52) U.S. Cl.
CPC . H04N 21/26258 (2013.01); H04N 21/41407 (2013.01); H04N 21/4331 (2013.01); H04N 21/6581 (2013.01)

(58) Field of Classification Search
CPC ....... H04N 21/26258; H04N 21/41407; H04N 21/4331; H04N 21/6581
See application file for complete search history.

(56) References Cited

U.S. PATENT DOCUMENTS

| 2013/0254347 A1 | 9/2013 | McGowan |
| 2013/0282915 A1 | 10/2013 | Patel et al. |
| 2014/0013349 A1 | 1/2014 | Millar et al. |
| 2014/0115625 A1* | 4/2014 | McCoy ................. H04N 21/84 725/34 |
| 2015/0288993 A1 | 10/2015 | Cho et al. |
| 2016/0165319 A1* | 6/2016 | Sun ..................... H04N 21/4532 725/32 |
| 2017/0150192 A1 | 5/2017 | Sellers et al. |
| 2019/0075148 A1* | 3/2019 | Nielsen ............ H04N 21/47217 |
| 2019/0356711 A1 | 11/2019 | Choi |
| 2020/0014985 A1* | 1/2020 | Garmark ............ H04N 21/2387 |
| 2020/0221151 A1* | 7/2020 | Hosur ..................... H04L 67/02 |
| 2021/0209154 A1* | 7/2021 | Chen .................... G11B 27/031 |

* cited by examiner

Primary Examiner — Chris Parry
Assistant Examiner — Steven C Nguyen
(74) Attorney, Agent, or Firm — Morgan, Lewis & Bockius LLP

(57) ABSTRACT

An electronic device associated with a media-providing service receives a first media item and a request, from a second device, for playback of the first media content item. The electronic device determines an insertion time within the first media content item for inserting a second media content item, and generates a queue indicating an order in which a first, second, and third file are to be provided. The first file corresponds to a portion of the first media content item from a start of the first media content item until the insertion time, the second file corresponds to the second media content item, and the third file corresponds to a portion of the first media content item starting at the insertion time. The electronic device generates the files, and queues the second electronic device to play back the first, second, and the third files in accordance with the queue.

18 Claims, 12 Drawing Sheets

600

602 At a first electronic device associated with a media-providing service, the first electronic device having one or more processors and memory storing instructions for execution by the one or more processors:

604 Receive a first media content item from a producer of the first media content item.

606 Receive, from a second electronic device, a first request to initiate playback of the first media content item

608 In response to receiving the first request:

610 Determine a first insertion time within the first media content item for inserting a second media content item into the first media content item. The second media content item is distinct from the first media content item.

620 Receiving the first media content item from the producer of the first media content item includes receiving a plurality of insertion times, and determining the first insertion time for inserting the second media content item includes selecting the first insertion time from the plurality of insertion times.

612 Generate a queue that indicates an order in which a first file, a second file that is distinct from the first file, and a third file that is distinct from each of the first file and the second file are to be provided. The first file corresponds to a first portion of the first media content item from a start of the first media content item until the first insertion time, the second file corresponds to the second media content item, and the third file corresponds to a second portion of the first media content item starting at the first insertion time.

614 Generate the first file and the third file in accordance with the queue.

(A)

616 Provide the first media content item and the second media content item to the second electronic device, including queuing the second electronic device to playback the first file, the second file, and the third file in accordance with the queue.

614 Generate the first file and the third file in accordance with the queue.

630 The first media content item includes a plurality of segments, and generating the first file and the third file in accordance with the queue includes:

632 Identify a first subset of the plurality of segments in the first media content item that corresponds to the first portion of the first media content item.

634 Generate the first file from the first subset of the plurality of segments.

640 Repackage the first subset of the plurality of segments into the first file without decoding the first media content item and without re-encoding the first subset of the plurality of segments.

650 The first subset of the plurality of segments includes a first segment. The second subset of the plurality of segments includes a second segment that follows the first segment in the first media content item and includes a reference to the first segment. Generating the second file includes removing the reference to the first segment from the second segment.

636 Identify a second subset of the plurality of segments in the first media content item that corresponds to the second portion of the first media content item.

638 Generate the third file from the second subset of the plurality of segments.

642 Repackage the second subset of the plurality of segments into the third file without decoding the first media content item and without re-encoding the second subset of the plurality of segments.

FIG. 6B

SYSTEMS AND METHODS FOR ON-THE-FLY REPACKAGING

TECHNICAL FIELD

The disclosed embodiments relate generally to providing media content items for playback, and, in particular, to re-packaging media content items with secondary media content items for playback.

BACKGROUND

Access to electronic media, such as music and video content, has expanded dramatically over time. As a departure from physical media, media content providers stream media to electronic devices across wireless networks, improving the convenience with which users can digest and experience such content.

As more people access media content items using media content providers, there is an opportunity to use media content items as a platform for exposure to other media content items, products, or services.

Some types of media content, such as podcasts, may include embedded additional content, such as a song, an audio clip (e.g., from another source, such as an audio book, a news report, or another podcast), or an advertisement. This additional content is typically "baked-in" to the primary media content (e.g., included in the audio stream provided by the producer to the streaming service). In the case where the additional media content is a song or an audio clip, one challenge is to make sure that the media content provider is licensed to provide the additional media content. In the case where the additional media content is an advertisement, the media content provider may want the flexibility to provide advertisements that are up-to-date, and/or skip providing at least some of the advertisements (or skip providing advertisements altogether).

On the other hand, if the additional content is not baked in, another challenge with providing such media content for playback is that provision of the additional content usually involves pausing playback of the media content in order to play the additional content, then resuming playback of the media content from where it was paused. For certain devices (such as third-party devices), the media providing service may not have full control over the so-called "playback-stack," and thus is unable to stop and restart playback of media content in this manner (e.g., with a sufficient accuracy within, say, a tens of milliseconds), leading to difficulty in providing media content that includes additional content (e.g., advertisements or injected related content) for playback. Thus, conventional content injection methods may not provide additional content for playback as intended by a producer of the media content or as intended by a media providing service that provides the media content.

SUMMARY

There is a need for systems and methods for repackaging a primary media content item (e.g., requested media content item) that includes an inserted secondary media content item (e.g., additional content) into a plurality of files that are queued in a specific order for playback at any device. For example, it may be desirable to provide the primary and secondary media content items for playback by any device. However, as noted above, for third-party devices, a media provided service may have difficulty stopping and restarting playback in the middle of a file (e.g. while playing additional media content in the interim) with sufficient accuracy as to not affect user experience (e.g., within a tens of milliseconds). In some embodiments, it may be desirable to repackage the media content items on-the-fly (e.g., in response to receiving a request for playback of a primary media content item), including determining where in the primary media content item to insert secondary media content item. In some embodiments, it may be desirable to dynamically select and insert an advertisement in a primary media content item during on-the-fly repackaging (e.g., select personalized additional content to provide to the listener, wherein the selection is made on-the-fly). In another example, a producer of a podcast episode may wish to insert a song during playback of the podcast episode. This technical problem may be further complicated by additional challenges, such as rights to play the song and/or what version of the song should be played (e.g., based on what versions of the song are available for playback in different jurisdictions or locations). This allows the song to be played in circumstances in which the song is accessible to the listener (e.g., because the media providing service may have the right to play the song), but forgo playing the song in circumstances in which the song is not accessible to the listener. This also allows, in the case where there are multiple versions of the song that are available for playback in different jurisdictions, the media providing service to provide the correct version of the song for playback.

Some embodiments described herein relate to providing a primary media content item for playback, including inserting or injecting a secondary media content item (e.g., an advertisement or a song) into the primary media content item (e.g., podcast episodes) by creating a queue of separate files (including the primary media content item until the insertion point, the secondary media content item, and the primary media content item following the insertion). The queue includes repackaged portions of the primary media content item, with the secondary media content item positioned within the repackaged portions of the primary media content item. This allows a media-providing service to provide dynamic advertisements or other content to consumers of the media content (e.g., advertisements that can be selected based on preferences of the listener, the listener's context, etc.) without needing to be able to pause the primary media content. In addition, these embodiments also allow, e.g., a song to be inserted into a podcast in such a way that the user can skip the remainder of the song, without the need to pause the primary content.

For example, a device plays an episode from a podcast. The episode may include embedded advertisements or one or more secondary media content items (e.g., advertisements or music) that are to be played at specific times throughout the episode. The primary media content item includes one or more insertion times for inserting secondary media content items. The media-providing service provides the primary media content item and the secondary for media content item(s) for playback such that the primary media content item (e.g., episode) resumes after the secondary media content item is played. In this manner, the user seamlessly receives the primary and secondary media content.

More particularly, the systems and methods described herein generate a plurality of files where each file of the plurality of files corresponds to a different portion of the primary media content item. The plurality of files as well as a file corresponding to a secondary media content item (to be inserted for playback during playback of the primary media content item) are provided, for playback in sequential order, to a playback device as part of a queue. The playback device plays the plurality of files and the file corresponding to a secondary media content item in accordance with the queue. Thus, a device does not have to determine or hardwire stop or insertion times for inserting secondary media content items or restarting playback of primary media content items.

To that end, in accordance with some embodiments, a method is performed at an electronic device that is associated with a media-providing service. The electronic device has one or more processors and memory storing instructions for execution by the one or more processors. The method includes receiving a first media content item (e.g., primary media content item) from a producer of the first media content item, and receiving, from a second electronic device (e.g., a playback device, a third-party device) a request to initiate playback of the first media content item. The method includes, in response to receiving the request, determining a first insertion time within the first media content item for inserting a second media content item (e.g., secondary media content item) into the first media content item. The second media content item is distinct from the first media content item. The method also includes generating a queue that indicates an order in which a first file, a second file that is distinct from the first file, and a third file that is distinct from each of the first file and the second file are to be provided. The first file corresponds to a first portion of the first media content item from a start of the first media content item until the insertion time, the second file corresponds to the second media content item, and the third file corresponds to a second portion of the first media content item starting at the insertion time. The method further includes generating the first file and the third file in accordance with the queue and providing the first media content item and the second media content item to the second electronic device, including queuing the second electronic device to play back the first file, the second file, and the third file in accordance with the queue.

In accordance with some embodiments, a first electronic device that is associated with a media-providing service includes one or more processors and memory storing one or more programs configured to be executed by the one or more processors. The one or more programs include instructions for receiving a first media content item from a producer of the first media content item, and receiving, from a second electronic device a request to initiate playback of the first media content item. The one or more programs also include instructions for, in response to receiving the request, determining a first insertion time within the first media content item for inserting a second media content item into the first media content item. The second media content item is distinct from the first media content item. The one or more programs further include instructions for generating a queue that indicates an order in which a first file, a second file that is distinct from the first file, and a third file that is distinct from each of the first file and the second file are to be provided. The first file corresponds to a first portion of the first media content item from a start of the first media content item until the insertion time, the second file corresponds to the second media content item, and the third file corresponds to a second portion of the first media content item starting at the insertion time. The one or more programs also include instructions for generating the first file and the third file in accordance with the queue and providing the first media content item and the second media content item to the second electronic device, including queuing the second electronic device to play back the first file, the second file, and the third file in accordance with the queue.

In accordance with some embodiments, a computer-readable storage medium has stored therein instructions that, when executed by a server system (e.g., computer system, first electronic device) that is associated with a media-providing service, cause the server system to receive a first media content item from a producer of the first media content item, and to receive, from a second electronic device (e.g., a playback device, a third-party device) a request to initiate playback of the first media content item. The instructions also cause the server system to, in response to receiving the request, determine a first insertion time within the first media content item for inserting a second media content item (e.g., secondary media content item) into the first media content item. The second media content item is distinct from the first media content item. The instructions further cause the server system to generate a queue that indicates an order in which a first file, a second file that is distinct from the first file, and a third file that is distinct from each of the first file and the second file are to be provided. The first file corresponds to a first portion of the first media content item from a start of the first media content item until the insertion time, the second file corresponds to the second media content item, and the third file corresponds to a second portion of the first media content item starting at the insertion time. The instructions also cause the server system to generate the first file and the third file in accordance with the queue and provide the first media content item and the second media content item to the second electronic device, including queuing the second electronic device to play back the first file, the second file, and the third file in accordance with the queue.

Thus, systems are provided with improved methods for repackaging media content items for seamless playback on any device.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 6A-6C are flow diagrams illustrating a method of providing a media content item and a secondary media content item for playback, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of parameters could be termed a second set of parameters, and, similarly, a second set of parameters could be termed a first set of parameters, without departing from the scope of the various described embodiments. The first set of parameters and the second set of parameters are both sets of parameters, but they are not the same set of parameters.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1A:
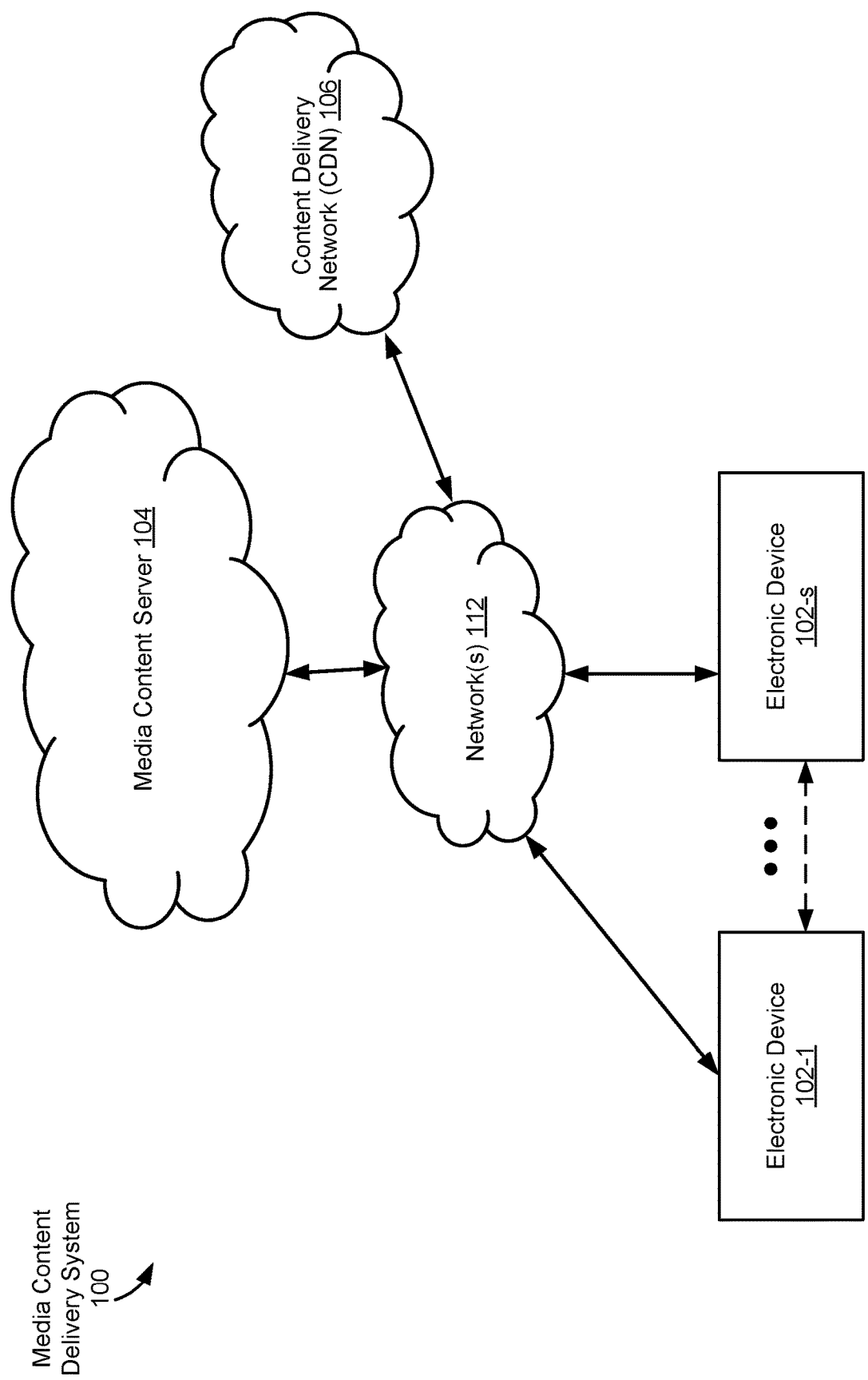
FIG. 1A is a block diagram illustrating a media content delivery system, in accordance with some embodiments.

FIG. 1A is a block diagram illustrating a media content delivery system 100, in accordance with some embodiments. The media content delivery system 100 includes one or more electronic devices 102 (e.g., electronic device 102-1 to electronic device 102-s, where s is an integer greater than one), one or more media content servers 104, and/or one or more content delivery networks (CDNs) 106. The one or more media content servers 104 are associated with (e.g., at least partially compose) a media-providing service (e.g., a media content provider). The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-s are the same type of device (e.g., electronic device 102-1 and electronic device 102-s are both speakers). Alternatively, electronic device 102-1 and electronic device 102-s include two or more different types of devices.

In some embodiments, electronic devices 102-1 and 102-s send and receive media-control information through network(s) 112. For example, electronic devices 102-1 and 102-s send media control requests (e.g., requests to play music, movies, videos, or other media items, or playlists thereof) to media content server 104 through network(s) 112. Additionally, electronic devices 102-1 and 102-s, in some embodiments, also send indications of media content items to media content server 104 through network(s) 112. In some embodiments, the media content items are uploaded to electronic devices 102-1 and 102-s before the electronic devices forward the media content items to media content server 104.

In some embodiments, electronic device 102-1 communicates directly with electronic device 102-s (e.g., as illustrated by the dotted-line arrow), or any other electronic device 102. As illustrated in FIG. 1A, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-s. In some embodiments, electronic device 102-1 communicates with electronic device 102-s through network(s) 112. In some embodiments, electronic device 102-1 uses the direct connection with electronic device 102-s to stream content (e.g., data for media items) for playback on the electronic device 102-s.

In some embodiments, electronic device 102-1 and/or electronic device 102-s include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 provides media content items to electronic devices 102-s (e.g., users) of the media-providing service. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 1B:
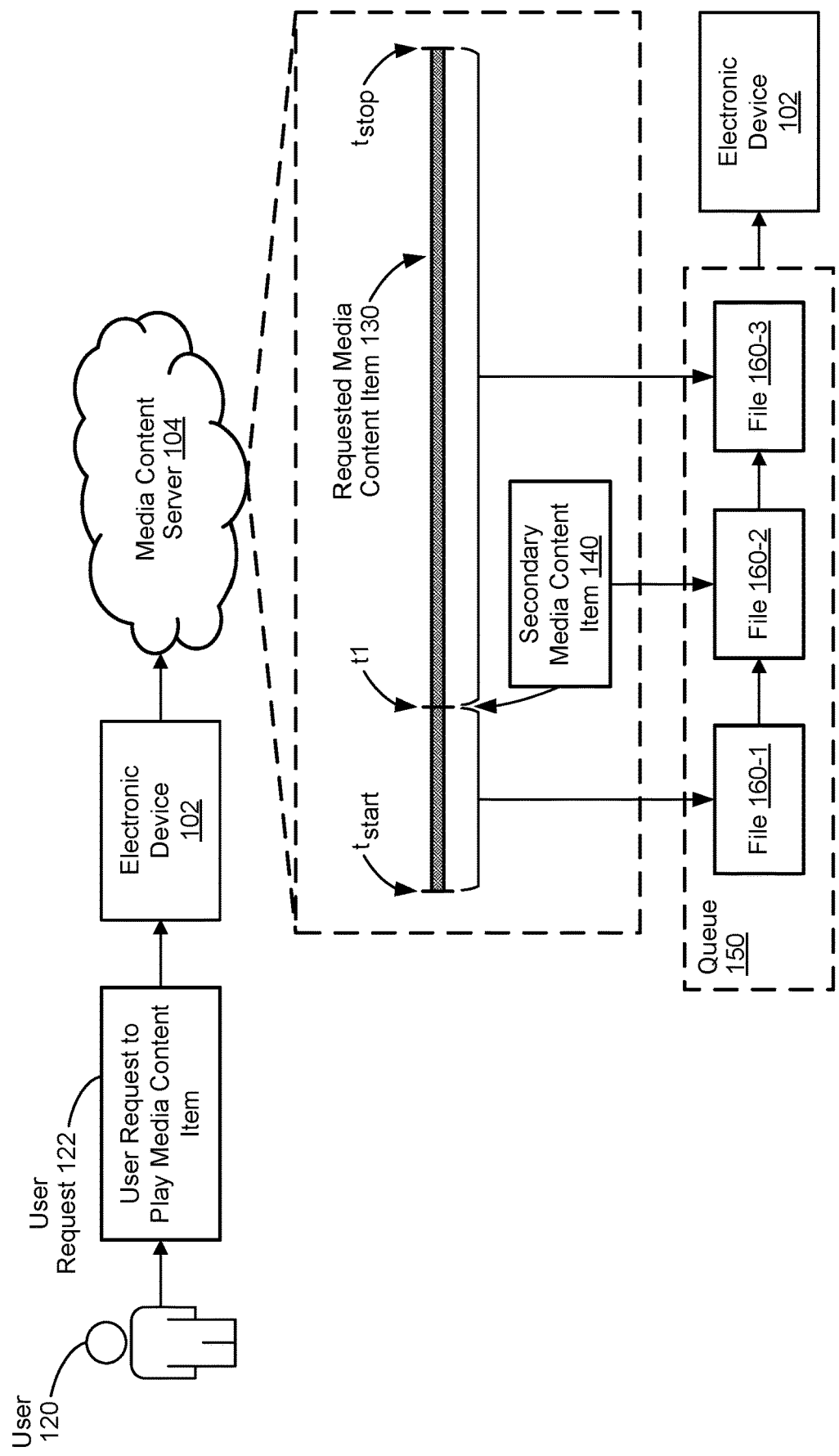
FIG. 1B illustrates providing a media content item requested by a user, in accordance with some embodiments.

FIG. 1B illustrates providing a media content item requested by a user, in accordance with some embodiments. An electronic device 102 (e.g., a user device or a client device, such as a personal computing device, a laptop, a smart home system, a smart accessory, a smart phone) receives a user request 122 from a user 120 to play (e.g., initiate playback) of a media content item 130. The requested media content item 130 (also referred to herein as a primary media content item) is hosted by a media content server 104 and may be provided to the electronic device 102 (or another presentation device, e.g., selected by the user 120 at electronic device 102 using a presentation device picker) by the media content server 104 or the CDN 106. In some embodiments, the requested media content item 130 includes one or more secondary media content items 140, that are different from the requested media content item 130, to be included as part of playback of the requested media content item 130 (e.g. the requested media content item includes metadata pointing to a secondary media content item). For example, the secondary content item 132 may be a song or a promotional offer (e.g., advertisement) that is played during playback of the requested media content item 130. In some embodiments, the secondary media content is selected "on-the-fly" and is thus not included in the requested media content item 130.

In some embodiments, a producer of the primary media content item 130 inserts (e.g. during production) content from the secondary media content item(s) 140 in the audio stream or audio file of the primary media content item 130. In some embodiments, a producer of the primary media content item 130 identifies the secondary media content item(s) 140 as being associated with the primary media content item 130. In some embodiments, a producer of the primary media content item 130 identifies one or more insertion points (e.g., insertion point t1) at which the secondary media content item 140 can be inserted.

In some embodiments, the primary media content item 130 and the secondary media content item 140 may be provided for playback by providing the primary media content item 130 for playback (e.g., starting at a start time ($t_{start}$) of the primary media content item 130), stopping playback of the primary media content item 130 at a predefined time (e.g., at insertion time t1) in the primary media content item 130, providing the secondary media content item 140 for playback, and providing playback of the primary media content item 130 starting at the predefined time (e.g., starting at the insertion time (t1) until a stop time ($t_{stop}$) of the primary media content item 130). However, this may pose a challenge in certain cases, such as when the primary media content item 130 and the secondary media content item 140 are being provided for playback at a third-party device, which may have difficulty pausing and restarting playback of a media content item at a time other than a start time of the media content item. The embodiments disclosed herein provide a method of providing a primary media content item(s) 130 and a secondary media content item(s) 140 for playback by providing a plurality of files 160 that can be queued for sequential playback. Each of the plurality of files corresponds to either a portion of the primary media content item 130 or to the secondary media content item 140. In the example shown in FIG. 1B, an electronic device 102 receives a user request 122 (e.g., from a user 120) to play a media content item 130. In response to receiving the user request 122, the electronic device 102 requests information from the media content server 104 that is required for the electronic device 102 to provide the requested media content item 130 for playback. The requested media content item 130 includes a start time ($t_{start}$) that corresponds to a start time of the media content item 130, a stop time ($t_{stop}$) that corresponds to a stop time of the media content item 130, and an insertion time (t1) that corresponds to a time in the media content item 130 at which a secondary media content item 140 is inserted (e.g., provided for playback). The media content server 104 generates: (i) a first file 160-1 corresponding to a first portion of the media content item 130 that begins at the start time ($t_{start}$)

and ends at the insertion time (t1), (ii) a second file 160-2 corresponding to the second media content item 140, and (iii) a third file 160-3 corresponding to a second portion of the media content item 130 that begins at the insertion time (t1) and ends at the stop time ($t_{stop}$). The media content server 104 also generates a queue 150 that indicates an order in which the first file 160-1, the second file 160-2, and the third file 160-3 are to be provided to the electronic device 102 for playback. The media content server 104 provides the requested media content item 130 and the secondary media content item 140 to the electronic device 102 by queuing the electronic device 102 to play back the first file 160-1, the second file 160-2, and the third file 160-3 in accordance with the queue 150. For example, given the determined stop/start times described above, the server system may general URLs for the electronic device 102 to access the first file, second file, and third file (e.g., these URLs may be generated on-the-fly).

Figure 2:
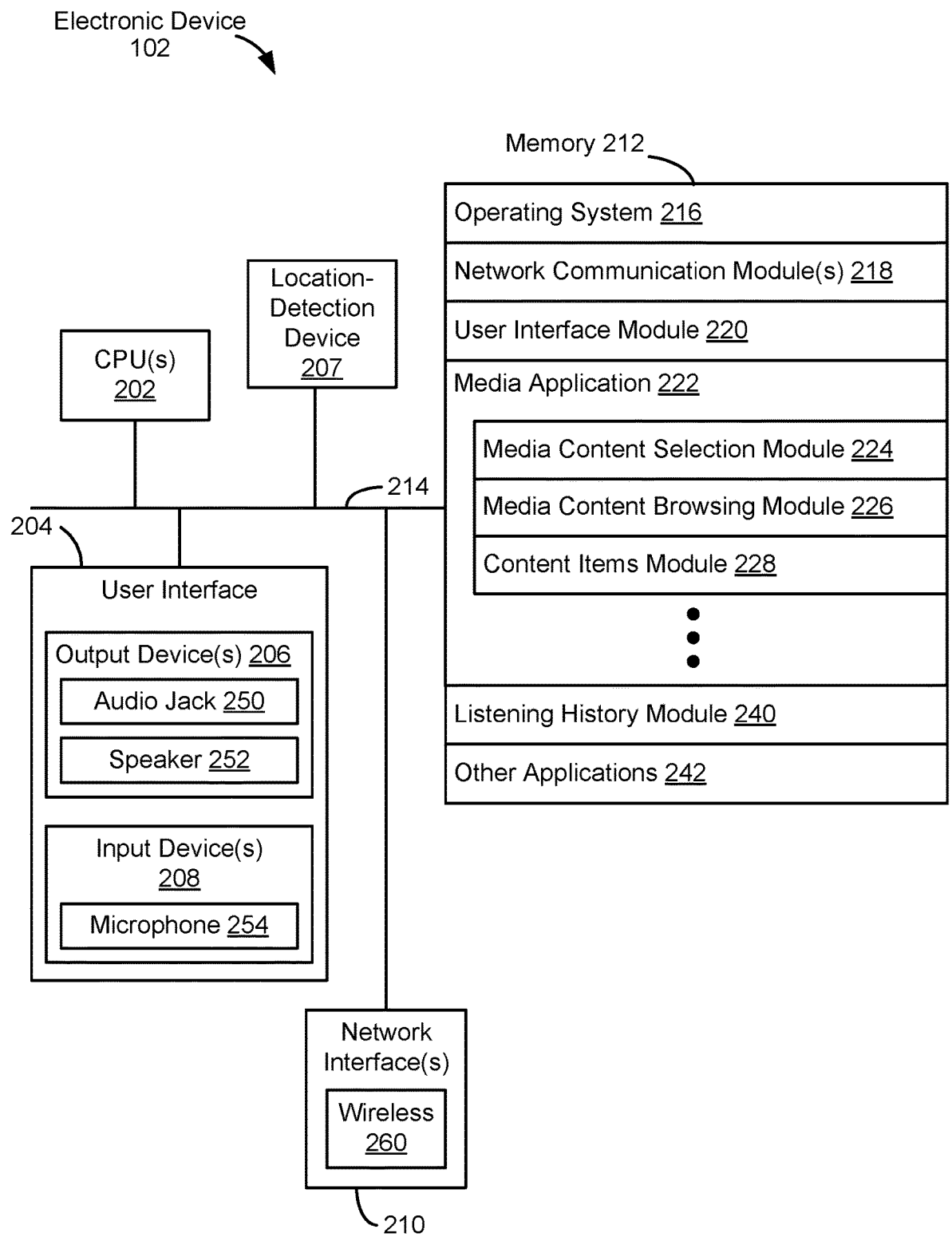
FIG. 2 is a block diagram illustrating a client device, in accordance with some embodiments.

FIG. 2 is a block diagram illustrating an electronic device 102 (e.g., electronic device 102-1 and/or electronic device 102-s, FIG. 1A), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include an audio jack 250 (or other physical output connection port) for connecting to speakers, earphones, headphones, or other external listening devices and/or speaker 252 (e.g., speakerphone device). Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 207, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1A).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 also includes the following modules (or sets of instructions), or a subset or superset thereof:
    - a media content selection module 224 for selecting one or more media content items and/or sending, to the media content server, an indication of the selected media content item(s);
    - a media content browsing module 226 for providing controls and/or user interfaces enabling a user to navigate, select for playback, and otherwise control or interact with media content, whether the media content is stored or played locally or remotely; and a content items module 228 for storing media items for playback at the electronic device;

a listening history module 240 (sometimes referred to as a playback history module) for storing (e.g., as a list for each user) media content items that have been presented (e.g., streamed, provided, downloaded, played) to a respective user and/or analyzing playback patterns for one or more users; and other applications 242, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
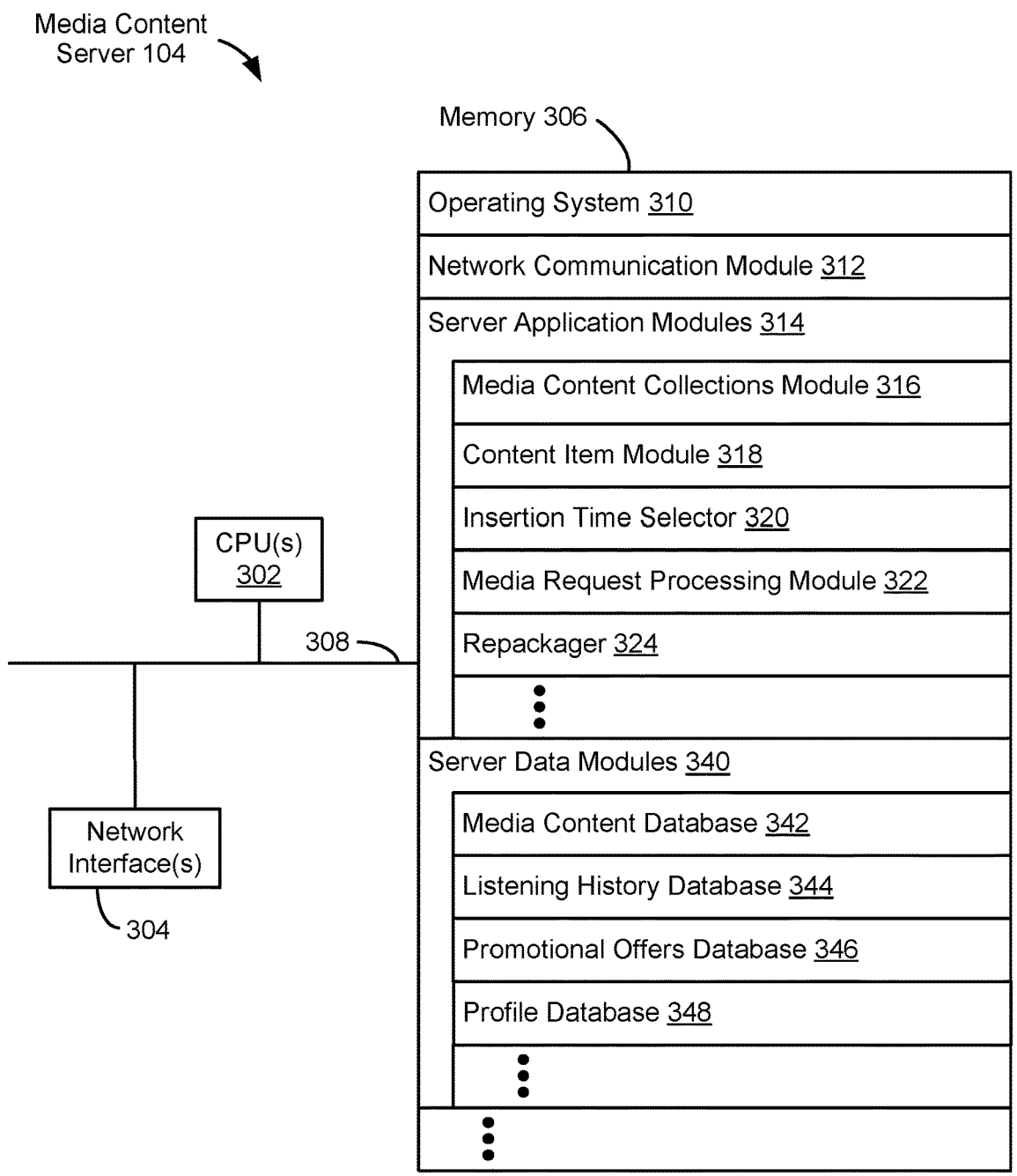
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content collections module 316 for storing and/or creating (e.g., curating) media content collections, each media content collection associated with one or more descriptor terms (e.g., playlist titles and/or descriptions) and/or including one or more media content items;

a content item collection module 318 for collecting and storing media items for playback;

an insertion time selector 320 for selecting an insertion time within a requested media content item at which to present secondary media content to a user. In some circumstances, one or more insertion times within a requested media content item are required insertion times (e.g., the producer of the media content item has marked certain insertion times are required). In some embodiments, the insertion time selector 320 selects one or more of the insertion times (in some cases, less than all possible insertion times) at which to provide a secondary media content item for playback;

a media request processing module 322 for retrieving media content items for playback, including primary media content items that are requested by a user and secondary media content items that are not requested by a user. The secondary media content item may be any of a song, podcast episode, newscast, radio broadcast, or a promotional offer (e.g., advertisement). When the secondary media content item is a promotional offer, the media request processing module 322 may work with an advertisement server to select and provide a promotional offer for playback. The media request processing module 322 may select which promotional offer to provide based on content in the primary media content item or based on information stored in a user's profile. In some embodiments, the media request processing module 322 may be in communication with a promotional offer server (e.g., an advertisement server) that stores and provides promotional offers for playback. When the secondary media content item is selected from a plurality of different versions, the media request processing module 322 determines and selects which version of the secondary media content item to provide for playback;

a repackager 324 configured to generate files from a media content item, including dividing (e.g., partitioning, portioning) a media content item into a plurality of files based on one or more insertion times within the media content item (e.g., the selected insertion times, described above). The repackager 324 is also configured to generate one or more files based on (e.g., from) a secondary media content item. The repackager 324 also includes a queue generator for generating queues that indicate an order in which files are provided to a device for playback (e.g., an order in which a device plays the files); and one or more server data module(s) 340 for handling the storage of and/or access to media items and/or metadata relating to the media items; in some embodiments, the one or more server data module(s) 340 include:

a media content database 342 for storing media content items;

a listening history database 344 (also referred to as a playback history database) for storing (e.g., as a list for each user) media content items that have been consumed (e.g., streamed, listened, viewed) by a respective user as well as storing listener retention information for media content items played by a respective user;

a promotional offer database 346 for storing promotional offers; and a profile database 348 for storing user profiles (e.g., user information) of users of the media-providing service.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 342 and/or promotional offer database 346 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
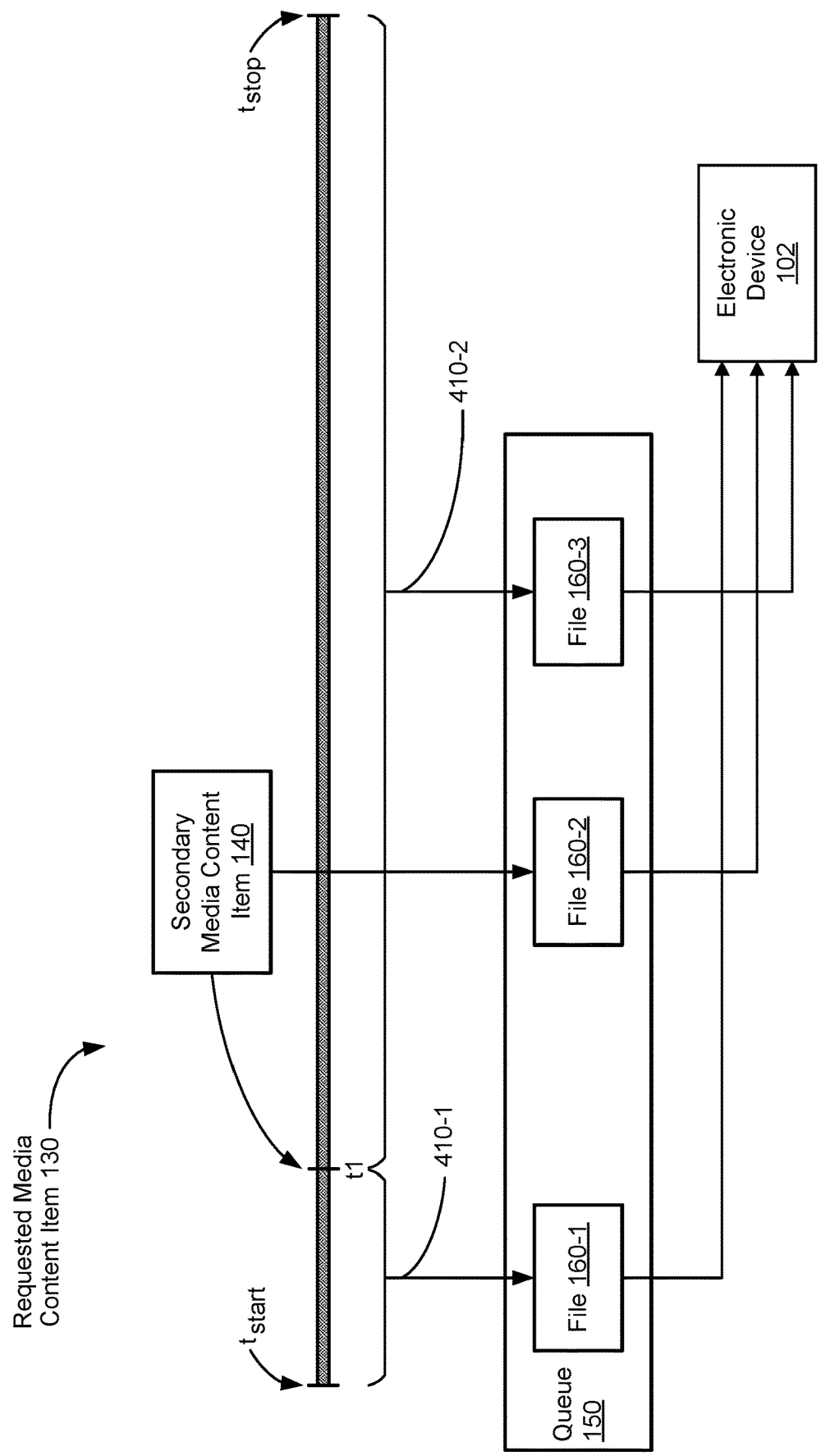
FIG. 4A illustrates providing a media content item with an inserted secondary media content item, in accordance with some embodiments.

FIG. 4A illustrates providing a media content item 130 with an inserted secondary media content item 140, in accordance with some embodiments. In response to receiving a user request for playback of a media content item 130, a media content server 104 generates a plurality of files 160 (e.g., files 160-1 through 160-3) to be provided to electronic device 102 for playback in a specific order that is defined by a queue 150. In some embodiments, as shown, the primary media content item 130 includes a start time ($t_{start}$) corresponding to a start time of the primary media content item 130, an insertion time (t1) corresponding to a time at which to provide the secondary media content item 140 for playback (e.g., to insert the secondary media content item 140), and a stop time ($t_{stop}$) corresponding to a stop time of the primary media content item 130. In some embodiments, the insertion time (t1) is determined by a producer (e.g., creator) of the primary media content item 130. In some embodiments, the secondary media content item 140 to be provided for playback during playback for the primary media content item 130 is identified (e.g., determined) by a producer of the primary media content item 130. In this example, a producer of the primary media content item 130 identifies a specific secondary media content item 140 to be played at insertion time (t1) of the primary media content item 130. For example, the primary media content item 130 may be a podcast episode and the secondary media content item 140 may be a specific song or a promotional offer (e.g., advertisement) to be played during the podcast episode. In some embodiments, the insertion time is selected (e.g., in response to receiving the request for the primary content item) from a plurality of insertion times (e.g., the insertion time is selected "on-the-fly").

The primary media content item 130 includes an insertion time (t1), a first portion 410-1 that starts at the start time ($t_{start}$) and ends at the insertion time (t1), and a second portion 410-2 that starts at the insertion time (t1) and ends at the stop time ($t_{stop}$). The media content server 104 generates a file 160-1 that corresponds to the first portion 410-1 of the primary media content item 130, and a file 160-3 that corresponds to the second portion 410-2 of the primary media content item 130. Thus, when file 160-1 is played, the first portion 410-1 of the primary media content item 130 is played from the start time ($t_{start}$) until the insertion time (t1) (e.g., file 160-1 stops at insertion time (t1)), then the second portion 410-2 of the primary media content item 130 is played from the insertion time (t1) until the stop time ($t_{stop}$) (e.g., file 160-3 starts playing at insertion time (t1)) after file 160-2 is played (e.g., after playback of file 160-2 is completed). In some embodiments, the media content server 104 also generates a file 160-2 that corresponds to (e.g., includes) the secondary media content item 140. Each of the files 160-1, 160-2, and 160-3 are distinct from one another. In some embodiments, none of the files does includes overlapping content (e.g., the files are non-overlapping with one another).

The media content server 104 also generates a queue 150 that defines (e.g., identifies, determines) an order in which the files 160-1, 160-2, and 160-3 are played. In this example, the queue 150 queues the file 160-1 to be played first, followed by file 160-2, then followed by file 160-3. The media content server 104 queues an electronic device 102 to play back the files 160 in accordance with an order defined by the queue 150. In some embodiments, the files 160-1, 160-2, and 160-3 are provided to the electronic device 102 at different times in accordance with the order defined by the queue 150. In such cases, file 160-1 is provided to the electronic device 102 at a first time, file 160-2 is provided to the electronic device 102 at a second time that follows the first time (e.g., the second time is after the first time, the second time is subsequent to the first time), and file 160-3 is provided to the electronic device 102 at a third time that follows the second time (e.g., the third time is after the first time and the second time). In some embodiments, the files 160-1, 160-2, and 160-3 are provided at a same time (e.g., simultaneously).

Figure 4B:
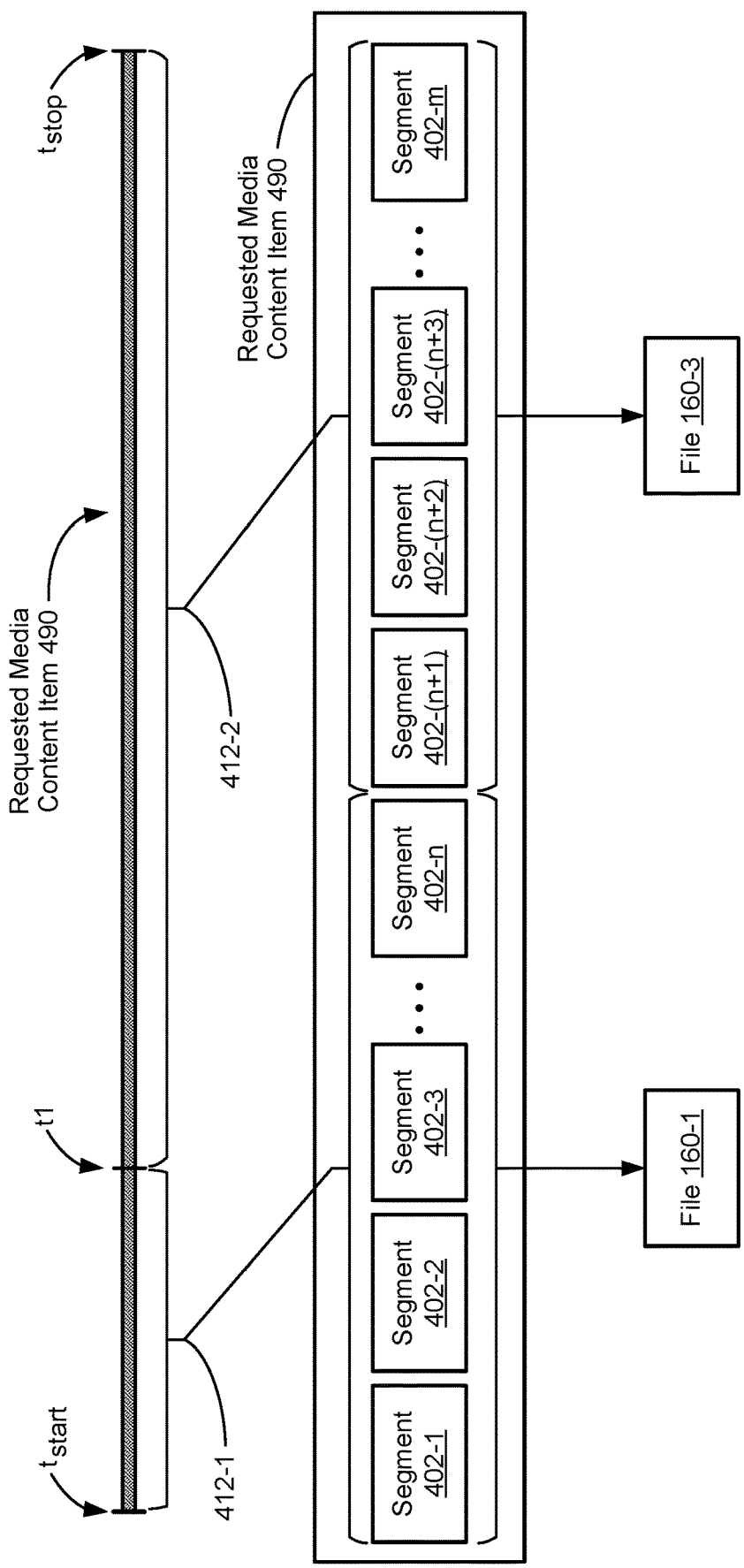
FIG. 4B illustrates generating a plurality of files from a media content item, in accordance with some embodiments.

FIG. 4B illustrates generating a plurality of files 160 from a media content item 490, in accordance with some embodiments. A media content item 490 provided by the media content server 104 (which may correspond to a primary media content item 130 or a secondary media content item 140) includes (e.g., is composed of, is comprised of, comprises) a plurality of segments 402 (e.g., segments 402-1 through 402-$m$), and each segment 402 corresponds to a part (e.g., a section) of the media content item 490. For example, if the media content item 490 includes audio content, such as the case where the media content item 490 is a podcast episode, a segment 402 may correspond to 10 milliseconds of audio content in the media content item 490. In some embodiments, each segment of the plurality of segments 402 has a same time duration (e.g., corresponds to a same time duration of media content). In some embodiments, different segments of the plurality of segments 402 have varying (e.g., different) time durations such that a first segment 402-1 has a different time duration from a second segment 402-2 (e.g., first segment 402-1 includes media content having a different time duration from media content included in second segment 402-2). In some embodiments, each segment of the plurality of segments 402 has a time duration between 1 millisecond and 200 milliseconds.

In order to generate a plurality of files 160 from the plurality of segments 402 of the media content item 490, the media content server 104 identifies (e.g., selects) a first subset of the plurality of segments 402 (e.g., segments 402-1 through 402-$n$) that corresponds to a first portion 412-1 of the media content item 490 and generates a file 160-1 from the first subset of the plurality of segments 402 (e.g., generates a file 160-1 from segments 402-1 through 402-$n$). The media content server 104 also identifies (e.g., selects) a second subset of the plurality of segments 402 (e.g., segments 402-($n$+1) through 402-$m$) that corresponds to a second portion 412-2 of the media content item 490 and generates a file 160-3 from the second subset of the plurality of segments 402 (e.g., generates a file 160-3 from segments 402-($n$+1) through 402-$m$). Thus, file 160-1 and 160-3 each have a longer time duration than a time duration corresponding to any individual segment of the plurality of segments 402. In some embodiments, the first subset and the second subset of the plurality of segments 402 do not include overlapping segments.

In some embodiments, a respective segment (e.g., frame) of the plurality of segments 402 includes a reference to a segment that precedes the respective segment. For example, in some embodiments, an audio file may begin with a "priming sample" that is fed into the decoder but not played (e.g., the priming sample comprises silent previous frames that are occur prior to the first audible frame). When the primary media content is repackaged, such priming samples need to be included in the resulting files. An example of an encoding format using audio priming is advanced audio coding (AAC).

In some embodiments, the plurality of segments 402 are encoded to form the media content item 490. In some embodiments, the media content server 104 generates the files 160-1 and 160-3 without decoding the media content item 130 and without re-encoding the segments 402. For example, the media content server 104 generates the file 160-1 from the first subset of the plurality of segments 402 (e.g., segments 402-1 through 402-$n$) without decoding the media content item 130 and without re-encoding the segments 402-1 through 402-$n$. Similarly, the file 160-3 is generated from the second subset of the plurality of segments 402 (e.g., segments 402-($n$+1) through 402-$m$) without decoding the media content item 130 and without re-encoding the segments 402-($n$+1) through 402-$m$.

In some embodiments, each segment of the plurality of segments 402 have a same file format. In some embodiments, the files 160-1 and 160-2 have a same file format as the plurality of segments 402 (e.g., the file format of the segments 402 are not changed when the segments 402 are repackaged into a file 160).

Figure 5A:
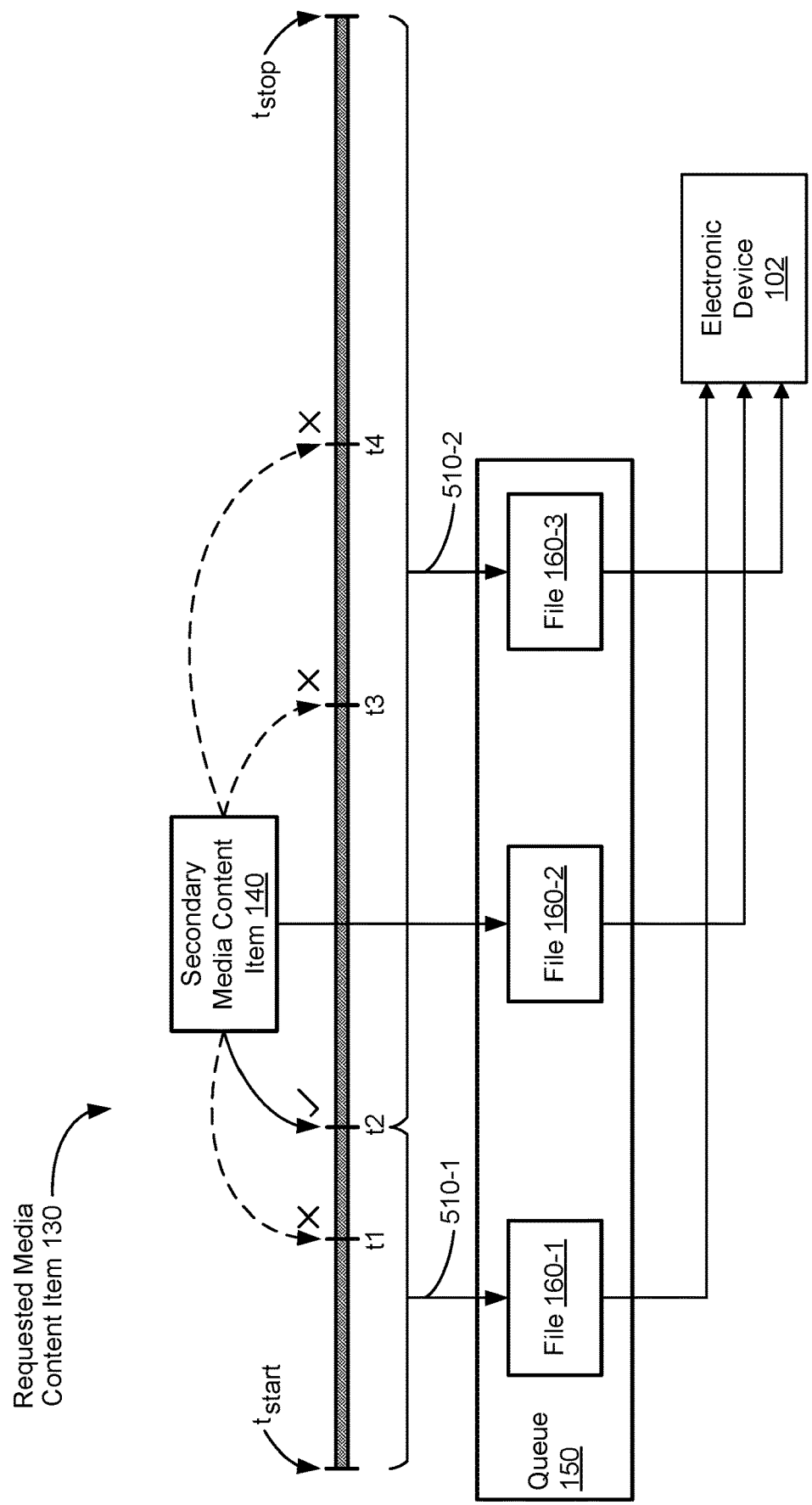
FIG. 5A illustrates a selecting an insertion point in a media content item at which to inject a secondary media content item, in accordance with some embodiments.

FIG. 5A illustrates selecting an insertion point in a media content item 130 at which to inject a secondary media content item 140, in accordance with some embodiments. In some embodiments, a media content item 130 includes a plurality of insertion points (t1, t2, t3, and t4) (e.g., possible insertion points) at which a secondary media content item can be inserted (e.g., provided for playback). The media content providing service 104 may select any (e.g., none or more, zero or more, or all) of the insertion times within the media content item 130. For example, a secondary media content item may be provided at each of the identified insertion points such that a secondary media content item corresponding to (e.g., that includes) a song (e.g., music, music content) is provided at insertion time t2, and other secondary media content items corresponding to (e.g., that includes) one or more promotional offers are provided at insertion times t1, t3, and t4. Alternatively, the media content providing service 104 may select a subset, less than all, of the insertion times within the media content item 130 at which to provide (e.g., insert) a secondary media content item for playback. For example, the media content server 104 selects insertion time t2 within media content item 130 for provision of a secondary media content item 140 and does not select any other insertion times (e.g., insertion times t1, t3, and t4 are skipped such that media content item 130 continues to play without pausing at the insertion times t1, t3, and t4). The media content server 104 generates a file 160-1 corresponding to a first portion 510-1 of the media content item 130 that starts at the start time ($t_{start}$) and ends at the selected insertion time t2, a file 160-2 corresponding to the secondary media content item 140, and a file 160-3 corresponding to a second portion 510-2 of the media content item 130 that starts at the selected insertion time t2 and ends at the stop time ($t_{stop}$). The media content server 104 also generates a queue 150 that identifies an order in which the files 160-1, 160-2, and 160-3 are to be played. In this example, the queue 150 dictates that the file 160-1 is played first, the file 160-2 is played after playback of the file 160-1 ceases, and the file 160-3 is played after playback of the file 160-2 ceases. The files 160-1 through 160-3 are provided (e.g., transmitted, delivered) to the electronic device 102 for playback in accordance with the queue 150.

In some embodiments, the secondary media content item 140 is identified by a producer of the media content item 130. For example, the media content item 130 may be a podcast episode and the producer of the media content item 130 may identify a specific song to be played during playback of the media content item 130. In some embodiments, the version of the secondary media content item 140 (e.g., the version of the song which is played during provision of the secondary media content item 140) is determined dynamically in response to receiving a user request for playback of the media content item 130. Alternatively, the secondary media content item 140 may be a specific promotional offer (e.g., an advertisement). In some embodiments, the content of the secondary media content item 140 (e.g., which advertisement(s) are played during provision of the secondary media content item 140) is determined dynamically in response to receiving a user request for playback of the media content item 130.

Figure 5B:
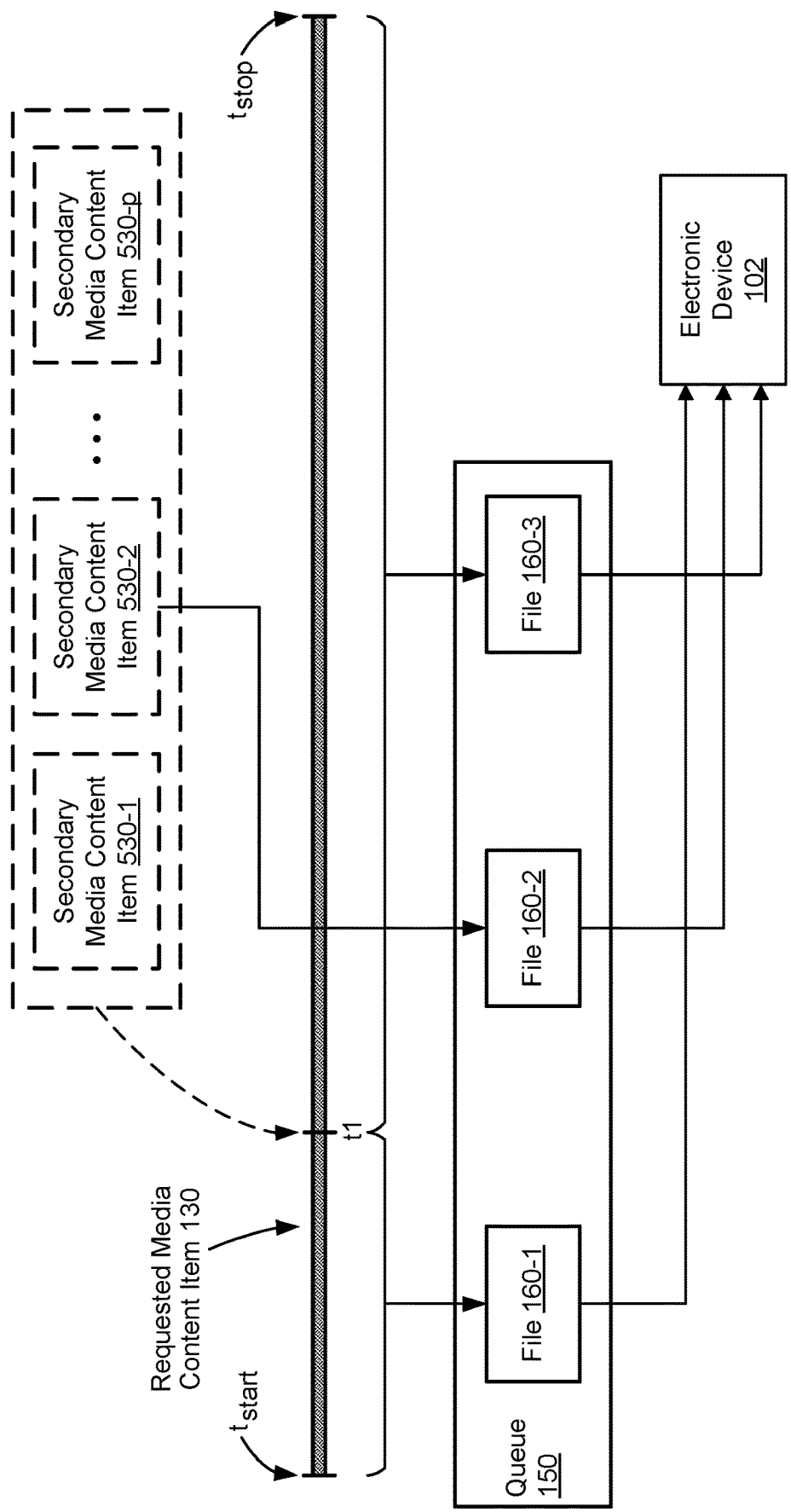
FIG. 5B illustrates selecting a secondary media content item to be included during playback of a media content item, in accordance with some embodiments.

FIG. 5B illustrates selecting a secondary media content item to be included during playback of a media content item, in accordance with some embodiments. In some embodiments, a media content server 104 dynamically selects (e.g., identifies) which secondary media content item to provide during playback of a media content item 130. In some embodiments, the secondary media content item is selected from a plurality of media content items 530 (e.g., media content items 530-1 through 530-$p$). In some embodiments, the plurality of media content items 530 may be a collection of media content items that are provided by the media content server 104 (e.g., stored at a database that is accessible to the media content server 104, the media content server 104 has obtained the right to provide the media content item(s) for playback). In some embodiments, the plurality of media content items 530 includes promotional offers (e.g., advertisements) that are provided by (e.g., stored at a database associated with) an advertisement server that is in communication with the media content server 104. Once the media content server 104 selects the secondary media content item to be provided during playback of the media content item 130, the media content server 104 generates a plurality of files 160 and a queue 150 that indicates an order in which the files 160 are to be provided to an electronic device 102 for playback. In the example provided in FIG. 5B, the media content server 104 selects secondary media content item 530-2, from a plurality of secondary media content items 530-1 through 530-*p*, for playback during playback of the media content item 130.

In some embodiments, the media content item 130 is a podcast episode and a secondary media content item is a specific song that is identified by a producer of the media content item 130. The media content server 104 selects a version of the song to be provided during playback of the media content item 130. For example, a song may include a plurality of versions. Thus, in response to receiving a user request to play the media content item 130, the media content server 104 selects one of the versions of the song for playback. In the example shown in FIG. 5B, the media content server 104 selects a version corresponding to the secondary media content item 530-2 to be provided for playback during playback of the media content item 130. In some embodiments, each of the plurality of secondary media content items (e.g., secondary media content items 530-1 through 530-*p*) corresponds to a different version of a same song. In some embodiments, a first version of the song corresponding to the secondary media content item 530-1 is licensed for playback in a first geographic region (e.g., South America), and a second version of the song corresponding to the secondary media content item 530-2 is licensed for playback in a second geographic region (e.g., Australia) that is different from the first geographic region. In such cases, the version of the song (e.g., the secondary media content item 530-2) is selected for playback based on a location associated with the user (e.g., a location of the electronic device 102, a location identified in the user's profile). Thus, a first user in the first geographic region (e.g., South America) may receive the first version of a song (e.g., a version corresponding to secondary media content item 530-1) during playback of the media content item 130, and a second user in a second geographic region of the world (e.g., Australia) may receive the second version of a song (e.g., a second version corresponding to secondary media content item 530-2), that is different from the first version, during playback of the media content item 130.

In some embodiments, the media content item 130 is a podcast episode and a secondary media content item is a promotional offer (e.g., advertisement). The media content server 104 selects a promotional offer from a plurality of promotional offers for playback during the media content item 130. In the example shown in FIG. 5B, the media content server 104 selects a promotional offer corresponding to secondary media content item 530-2 to be provided for playback during playback of the media content item 130. In some embodiments, the selected promotional offer 530-2 is selected based on a topic or subject of the media content item 130. For example, the media content item 130 may be a podcast about gardening and plants, and the selected promotional offer 530-2 may be an offer regarding a gardening supply store. In some embodiments, the selected promotional offer is selected based on information stored in a user profile associated with a user (e.g., based on information stored in a listening history for the user profile). For example, the media content server 104 may select a promotional offer 530-2 for a gardening supply store for a user whose profile indicates gardening as an interest, and the media content server 104 may select a promotional offer 530-*p* for a video game store for a user whose profile indicates video games as an interest.

In some embodiments, two different users that request the media content item 130 may receive different promotional offers during playback of the same media content item 130. Alternatively, two different users that request the media content item 130 may receive the same promotional offer during playback of the same media content item 130.

Figure 5C:
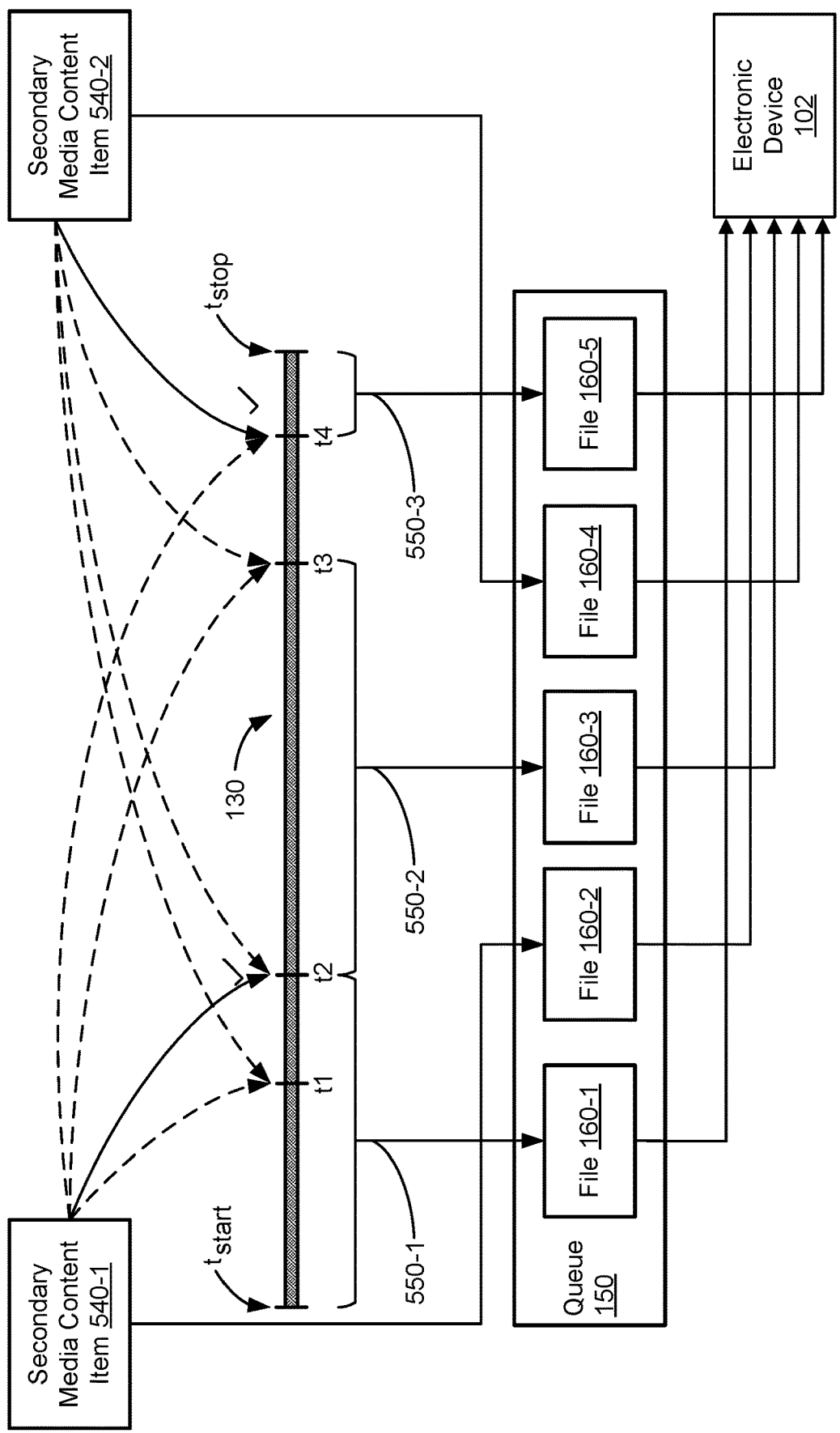
FIG. 5C illustrates generating a plurality of files from a media content item and one or more secondary media content items, in accordance with some embodiments.

FIG. 5C illustrates generating a plurality of files from a media content item and one or more secondary media content items, in accordance with some embodiments. In some embodiments, the files are generated in response to receiving a request for the media content item (e.g., in real time, or "on-the-fly," without user intervention). For example, as described above, in some embodiments, an insertion time for inserting the one or more secondary media content items is selected in response to receiving the request for the media content item and the files are generated in accordance with the selected insertion time.

To that end, a media content item 130 may include a plurality of insertion times (e.g., insertion times t1, t2, t3, and t4). In some embodiments, a media content server 104 selects a subset, less than all, of the insertion times. In some embodiments, the insertion times are provided by a producer of the media content item 130. In the example shown in FIG. 5C, the media content server 104 selects insertion times t2 and t4 at which to provide the secondary media content items 540-1 and 540-2, respectively. In some embodiments, any of the secondary media content items 540-1 and 540-2 may be specified (e.g., predetermined) by the producer of the media content item 130. For example, the producer of the media content item 130 may identify a song (e.g., music, musical content) to be provided (e.g., played) during playback of the media content item 130. In some embodiments, any of the secondary media content items 540-1 and 540-2 may be dynamically selected in response to receiving a request to provide the media content item 130 to an electronic device 102 for playback. For example, any of the secondary media content items 540-1 and 540-2 may be a version of a song that is selected to be provided (e.g., played) during playback of the media content item 130. In another example, any of the secondary media content items 540-1 and 540-2 may be a promotional offer that is selected to be provided (e.g., played) during playback of the media content item 130. In this example, a secondary media content item 540-1 is selected for playback at insertion time t2 (e.g., between a first portion 550-1 of the media content item 130 and a second portion 550-2 of the media content item 130, and another secondary media content item 540-2 is selected for playback at insertion time t4 (e.g., between the second portion 550-2 of the media content item 130 and a third portion 550-3 of media content item 130. In some embodiments, the secondary media content item 540-1 is different from the secondary media content item 540-2 (e.g., includes content that is different from content included in the secondary media content item 540-2). In some embodiments, the secondary media content item 540-1 is a different type of content than the secondary media content item 540-2. For example, the secondary media content item 540-1 may be a promotional offer, and the secondary media content item 540-2 is a song (e.g., music, music content), or vice versa. The media content server 104 generates files 160-1, 160-3, and 160-5 corresponding to the first portion 550-1, the second portion 550-2, and the third portion 550-3 of the media content item 130, respectively. In some embodiments, the media content server 104 also generates a file 160-2 corresponding to the secondary media content item 540-1, and a file 160-4 corresponding to the secondary media content item 540-2. The media content server 104 generates a queue 150 that indicates an order in which the files 160 (e.g., files 160-1 through 160-5) are to be provided for playback (e.g., an order in which the files 160 are played by electronic device 102).

In some embodiments, the media content server 104 receives a new request to provide the media content item 130 to a new electronic device that is distinct from the electronic device 102. For example, the new electronic device may be associated with a different user profile than the electronic device 102. In a first example, in response to receiving the new request to provide the media content item 130 to the new electronic device, the media content server 104 provides the secondary media content item 540-1 at insertion time t2 and provides secondary media content item 540-2 at insertion time t1. In a second example, in response to receiving the new request to provide the media content item 130 to the new electronic device, the media content server 104 provides the media content item 130 without providing any secondary media content items. In a third example, in response to receiving the new request to provide the media content item 130 to the new electronic device, the media content server 104 provides the secondary media content item 540-1 at insertion time t2 and provides a secondary media content item that is different from the secondary media content item 540-2 (and also different from the secondary media content item 540-1) at insertion time t4.

Any of the embodiments described with respect to FIGS. 4A-4B, and 5A-5C describe can be used in any combination to provide a media content item 130 and one or more secondary media content items for playback.

Figure 6C:
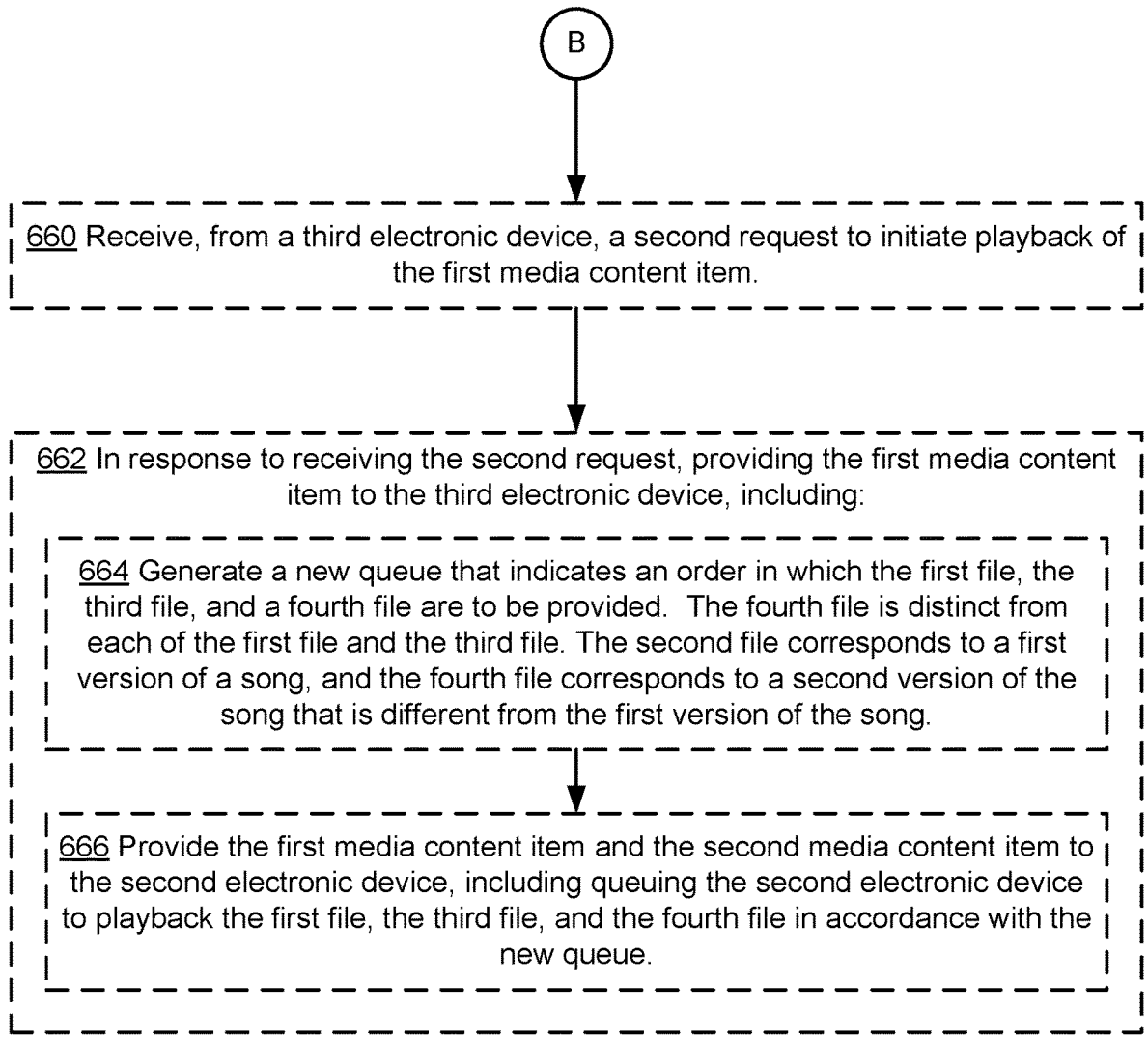

FIGS. 6A-6C are flow diagrams illustrating a method 600 of providing a media content item and a secondary media content item for playback, in accordance with some embodiments. Method 600 may be performed (602) at an electronic device (e.g., media content server 104) having one or more processors and memory storing instructions for execution by the one or more processors. In some embodiments, the method 600 is performed by executing instructions stored in memory (e.g., memory 306, FIG. 3) of the electronic device. In performing the method 600, an electronic device receives (604) a first media content item 130 (e.g., primary media content item) from a producer (e.g., source) of the first media content item 130. The electronic device also receives (606), from a second electronic device 102 that is distinct from the first electronic device, a first request to initiate playback of the first media content item 130. In response (608) to receiving the first request, the electronic device determines (610) a first insertion time (e.g., insertion time t1, shown in FIG. 4A) within the first media content item 130 for inserting a second media content item 140 (e.g., secondary media content item 140) into the first media content item. The second media content item 140 is distinct from the first media content item 130. In some embodiments, the electronic device receiving (620) the first media content item from the producer of the first media content item includes receiving a plurality of insertion times. In such embodiments, determining the first insertion time for inserting the second media content item includes selecting the first insertion time from the plurality of insertion times.

The electronic device also generates a queue of a sequence of distinct files corresponding to the first media content item and the second media content item, wherein a file corresponding to the second media content item is positioned in the queue within files corresponding to the first media content item. In particular, the electronic device generates (612) a queue that indicates an order in which a first file 160-1, a second file 160-2 that is distinct from the first file 160-2, and a third file 160-3 that is distinct from each of the first file 160-1 and the second file 160-2 are to be provided. The first file 160-1 corresponds to a first portion 410-1 of the first media content item 130 from a start (e.g., start time, $t_{start}$) of the first media content item 130 until the insertion time t1, the second file 160-2 corresponds to the second media content item 140, and the third file corresponds to a second portion 410-2 of the first media content item 130 starting at the insertion time t1. The electronic device also generates (614) the first file 160-1 and the third file 160-3 in accordance with the queue 150, and provides (616) the first media content item 130 and the second media content item 140 to the second electronic device 102, including queuing the second electronic device 102 to play back the first file 160-1, the second file 160-2, and the third file 160-3 in accordance with the queue 150.

In some embodiments, the first media content item 130 includes a plurality of segments 402. In such cases, in order to generate the first file 160-1 and the third file 160-3, the electronic device identifies (632) a first subset of the plurality of segments 402 (e.g., segments 402-1 through 402-$n$) in the first media content item 130 that corresponds to the first portion 410-1 of the first media content item 130, generates (634) the first file from the first subset of the plurality of segments 402, identifies (636) a second subset of the plurality of segments 402 (e.g., segments 402-($n$+1) through 402-$m$) in the first media content item 130 that corresponds to the second portion 410-2 of the first media content item 130, and generates (638) the third file 160-3 from the second subset of the plurality of segments 402. FIG. 4B illustrates the process of generating files 160-1 and 160-3 from a plurality of segments 402.

In some embodiments, the electronic device also repackages (640) the first subset of the plurality of segments 402 (e.g., segments 402-1 through 402-$n$) into the first file 160-1 without decoding the first media content item 130 and without re-encoding the first subset of the plurality of segments 402. In some embodiments, the electronic device also repackages (642) the second subset of the plurality of segments 402 (e.g., segments 402-($n$+1) through 402-$m$) into the third file 160-3 without decoding the first media content item 130 and without re-encoding the second subset of the plurality of segments 402.

In some embodiments, the first subset of the plurality of segments 402 (e.g., segments 402-1 through 402-$n$) includes a first segment 402-$n$, and the second subset of the plurality of segments 402 (e.g., segments 402-($n$+1) through 402-$m$) includes a second segment 402-($n$+1) that follows the first segment 402-$n$ in the first media content item 130. The first segment includes a reference to the second segment. In some embodiments, in order to generate the second file 160-2, the electronic device removes (650) the reference to the first segment 402-$n$ from the second segment 402-($n$+1).

In some embodiments, the plurality of segments 402, the first file 160-1, and the third file 160-3 have a same file format.

In some embodiments, the second file 160-2 is associated with a promotional offer (e.g., advertisement).

In some embodiments, the first file 160-1 and the third file 160-3 include spoken word content and the second file 160-2 includes music.

In some embodiments, the electronic device also receives (660), from a third electronic device, a second request to initiate playback of the first media content item 130. The third electronic device is distinct from each of the electronic device and the second electronic device 102 (e.g., the third electronic device is a different device from the electronic device and the second electronic device 102). In response (662) to receiving the second request, the electronic device provides the first media content item 130 to the third electronic device, including generating (664) a new queue that indicates an order in which the first file 160-1, the third file 160-3, and a fourth file are to be provided. The fourth file is distinct from each of the first file 160-1 and the third file 160-3. The second file 160-2 corresponds to a first version of a song (e.g., music, music content), and the fourth file corresponds to a second version of the song that is different from the first version of the song. The electronic device also provides (666) the first media content item 130 and the second media content item 140 to the second electronic device 102, including queuing the second electronic device 102 to play back the first file 160-1, the third file 160-3, and the fourth file in accordance with the new queue.

In some embodiments, the first media content item 130 includes an indication to insert the second media content item 140 at the insertion time. For example, a producer of the first media content item 130 may include an indication that the second media content item 140 is to be inserted (e.g., played at, provided at) the insertion time t1.

Although FIGS. 6A-6C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at a first electronic device associated with a media-providing service, the first electronic device having one or more processors and memory storing instructions for execution by the one or more processors:
   receiving a first media content item comprising a plurality of segments from a producer of the first media content item;
   receiving, from a second electronic device, a first request to initiate playback of the first media content item; and
   in response to receiving the first request:
      determining a first insertion time within the first media content item for inserting a second media content item, distinct from the first media content item, into the first media content item;
      generating a queue that indicates an order in which a first file, a second file that is distinct from the first file, and a third file that is distinct from each of the first file and the second file are to be provided, wherein:
         the first file corresponds to a first subset of the plurality of segments of the first media content item from a start of the first media content item until the first insertion time;
         the second file corresponds to the second media content item; and
         the third file corresponds to a second subset of the plurality of segments of the first media content item starting at the first insertion time, and includes information corresponding to a reference to a segment in the first subset of the plurality of segments;
      generating the first file and the third file in accordance with the queue without decoding the first media content item and without re-encoding the first subset of the plurality of segments or the second subset of the plurality of segments; and
      providing the first media content item and the second media content item to the second electronic device, including queuing the second electronic device to play back the first file, the second file, and the third file in accordance with the queue.

2. The method of claim 1, wherein:
   receiving the first media content item from the producer of the first media content item includes receiving a plurality of insertion times; and
   determining the first insertion time for inserting the second media content item includes selecting the first insertion time from the plurality of insertion times.

3. The method of claim 1, wherein:
   generating the first file and the third file in accordance with the queue further includes:
      identifying a first subset of the plurality of segments in the first media content item that correspond to the first portion of the first media content item;
      generating the first file from the first subset of the plurality of segments;
      identifying a second subset of the plurality of segments in the first media content item that correspond to the second portion of the first media content item; and
      generating the third file from the second subset of the plurality of segments.

4. The method of claim 3, wherein:
   the first subset of the plurality of segments includes a first segment;
   the second subset of the plurality of segments includes a second segment that follows the first segment in the first media content item and includes a reference to the first segment; and
   generating the second file includes removing the reference to the first segment from the second segment.

5. The method of claim 3, wherein the plurality of segments, the first file, and the third file have a same file format.

6. The method of claim 1, wherein the second file is associated with a promotional offer.

7. The method of claim 1, wherein the first file and the third file include spoken word content and the second file includes music.

8. The method of claim 7, wherein the second file corresponds to a first version of a song, the method further comprising:
   receiving, from a third electronic device, a second request to initiate playback of the first media content item; and
   in response to receiving the second request, providing the first media content item to the third electronic device, including:

generating a new queue that indicates an order in which the first file, the third file, and a fourth file that is distinct from each of the first file and the third file are to be provided, wherein the fourth file corresponds to a second version of the song that is different from the first version of the song; and providing the first media content item and the second media content item to the second electronic device, including queuing the third electronic device to play back the first file, the third file, and the fourth file in accordance with the new queue.

9. The method of claim 1, wherein the first media content item includes an indication to insert the second media content item at the first insertion time.

10. The method of claim 1, wherein the third file further comprises a priming sample that comprises silent frames that occur prior to a first audible frame of the third file.

11. A server system of a media-providing service, comprising:
one or more processors; and
memory storing one or more programs for execution by the one or more processors, the one or more programs comprising instructions for performing a set of operations, comprising:
receiving a first media content item comprising a plurality of segments from a producer of the first media content item;
receiving, from a second electronic device, a first request to initiate playback of the first media content item; and
in response to receiving the first request:
determining a first insertion time within the first media content item for inserting a second media content item, distinct from the first media content item, into the first media content item;
generating a queue that indicates an order in which a first file, a second file that is distinct from the first file, and a third file that is distinct from each of the first file and the second file are to be provided, wherein:
the first file corresponds to a first subset of the plurality of segments of the first media content item from a start of the first media content item until the first insertion time;
the second file corresponds to the second media content item; and
the third file corresponds to a second subset of the plurality of segments of the first media content item starting at the first insertion time, and includes information corresponding to a reference to a segment in the first subset of the plurality of segments;
generating the first file and the third file in accordance with the queue without decoding the first media content item and without re-encoding the first subset of the plurality of segments or the second subset of the plurality of segments; and
providing the first media content item and the second media content item to the second electronic device, including queuing the second electronic device to play back the first file, the second file, and the third file in accordance with the queue.

12. The server system of claim 11, wherein:
receiving the first media content item from the producer of the first media content item includes receiving a plurality of insertion times; and
determining the first insertion time for inserting the second media content item includes selecting the first insertion time from the plurality of insertion times.

13. The server system of claim 11, wherein:
generating the first file and the third file in accordance with the queue further includes:
identifying a first subset of the plurality of segments in the first media content item that correspond to the first portion of the first media content item;
generating the first file from the first subset of the plurality of segments;
identifying a second subset of the plurality of segments in the first media content item that correspond to the second portion of the first media content item; and
generating the third file from the second subset of the plurality of segments.

14. The server system of claim 13, wherein:
the first subset of the plurality of segments includes a first segment;
the second subset of the plurality of segments includes a second segment that follows the first segment in the first media content item and includes a reference to the first segment; and
generating the second file includes removing the reference to the first segment from the second segment.

15. A non-transitory computer-readable storage medium storing one or more programs configured for execution by a computer system associated with a media-providing service, the one or more programs comprising instructions for performing a set of operations, comprising:
receiving a first media content item comprising a plurality of segments from a producer of the first media content item;
receiving, from a second electronic device, a first request to initiate playback of the first media content item; and
in response to receiving the first request:
determining a first insertion time within the first media content item for inserting a second media content item, distinct from the first media content item, into the first media content item;
generating a queue that indicates an order in which a first file, a second file that is distinct from the first file, and a third file that is distinct from each of the first file and the second file are to be provided, wherein:
the first file corresponds to a first subset of the plurality of segments of the first media content item from a start of the first media content item until the first insertion time;
the second file corresponds to the second media content item; and
the third file corresponds to a second subset of the plurality of segments of the first media content item starting at the first insertion time, and includes information corresponding to a reference to a segment in the first subset of the plurality of segments;
generating the first file and the third file in accordance with the queue without decoding the first media content item and without re-encoding the first subset of the plurality of segments or the second subset of the plurality of segments; and
providing the first media content item and the second media content item to the second electronic device, including queuing the second electronic device to play back the first file, the second file, and the third file in accordance with the queue.

16. The non-transitory computer-readable storage medium of claim 15, wherein:
   receiving the first media content item from the producer of the first media content item includes receiving a plurality of insertion times; and
   determining the first insertion time for inserting the second media content item includes selecting the first insertion time from the plurality of insertion times.

17. The non-transitory computer-readable storage medium of claim 15, wherein:
   generating the first file and the third file in accordance with the queue further includes:
      identifying a first subset of the plurality of segments in the first media content item that correspond to the first portion of the first media content item;
      generating the first file from the first subset of the plurality of segments;
      identifying a second subset of the plurality of segments in the first media content item that correspond to the second portion of the first media content item; and
      generating the third file from the second subset of the plurality of segments.

18. The non-transitory computer-readable storage medium of claim 17, wherein:
   the first subset of the plurality of segments includes a first segment;
   the second subset of the plurality of segments includes a second segment that follows the first segment in the first media content item and includes a reference to the first segment; and
   generating the second file includes removing the reference to the first segment from the second segment.

* * * * *